UNITED STATES PATENT OFFICE.

ROBERT R. MAFFETT, OF BAYONNE, NEW JERSEY, ASSIGNOR TO INTERNATIONAL NICKEL COMPANY, A CORPORATION OF NEW JERSEY.

RECOVERY OF METALS.

No. 833,722.   Specification of Letters Patent.   Patented Oct. 16, 1906.

Application filed December 26, 1905. Serial No. 293,213.

*To all whom it may concern:*

Be it known that I, ROBERT R. MAFFETT, of Bayonne, Hudson county, New Jersey, have invented a new and useful Improvement in the Recovery of Metals, of which the following is a specification.

In the art of reducing nickel-copper ores it has been the practice to smelt the matte containing sulfids of nickel, copper, and iron in a cupola-furnace, together with a charge of coke and sulfate of sodium, in the form of crude niter cake. The carbon of the coke reduces the sulfate of sodium to sulfid of sodium, and as this material when fused has a solvent action upon the copper and iron sulfids contained in the matte it will dissolve them to a considerable extent, so that when the molten contents of the furnace are tapped into settling-pots the materials will stratify, the sulfid of nickel, together with some sulfid of sodium, will settle to the bottom, and the sulfid of sodium, with the copper and iron sulfids in solution, will float on the top. The mass when solidified is divided into tops and bottoms, the tops containing sulfids of copper, iron, and sodium and the bottoms containing sulfid of nickel, together with such of the sulfids of copper and iron as have not been taken up in solution in the sulfid of sodium. The bottoms are again charged into the smelting-furnace with sulfate of sodium and are resmelted a sufficient number of times to purify the material to such an extent as to leave the nickel therein nearly free from copper, generally reducing the copper to less than one per cent. After having thus been treated the bottoms are crushed and leached for the purpose of removing the soluble portions of the sodium compound, and the product is dried and partially calcined and is then mixed with sodium chlorid and sodium sulfate and again calcined. The sodium chlorid and sodium sulfate react to produce chlorin gas, which converts the copper contained in the mass partially to the form of copper chlorid and the remainder of the copper to copper sulfate, the nickel being converted largely to the form of nickel oxid and partially to the form of nickel sulfate. The calcined product is then leached with water for the purpose of removing the soluble salts of the three metals—namely, the copper chlorid and copper sulfate, sodium sulfate, and nickel sulfate. The residuum is then rewashed with dilute sulfuric acid, which removes the copper as a sulfate, but does not attack the nickel oxid. It has been the practice heretofore to precipitate the metals from these solutions by the addition of sodium carbonate or sodium sulfid and then to remove the precipitate by passing the liquor through filter presses, in which operation the sodium compound is lost.

I have discovered that the operation of precipitating and filtering can be avoided and that the sodium compound which hitherto has been lost can be recovered by drawing off the liquor which results from the washing of the nickel-copper compounds with water and sulfuric acid and which contains in solution sulfate of sodium and sulfates of copper and nickel and without the precipitation treatment which has been employed heretofore, introducing it into a vat, where it is subjected to heat and is concentrated to the point of crystallization, at which the sodium-copper-nickel sulfate is recovered in the form of crystals. These crystals are taken from the vat and can be introduced directly into the smelting-furnace as a part of the charge of matte, coke, and sodium sulfate in the same manner in which niter cake has heretofore been introduced, and it has the advantage not only of supplying the sulfate of sodium requisite for the smelting operation, but also of saving the contained copper and nickel, which pass with the molten contents of the furnace into the settling-pots and are there recovered.

My invention not only saves the sulfate of soda which has heretofore been lost as a result of the precipitation and filtering process, but it dispenses with the need of such precipitation and filtering and the subsequent smelting of the precipitate, and thus effects a large economy in the recovery of the metals.

In the practice of the invention I prefer to use an evaporating tank or pan having steam-coils therein, and I take the solution of nickel-copper-sodium sulfate directly from the leaching-vats and convey it in pipes to the tank, where it is heated and crystallized.

The apparatus and the steps of the process may be modified in various ways by those skilled in the art, since

What I claim is—

1. In the art of separating matte containing sulfids of metals unequally soluble in the fused sulfid of an alkaline metal, the method herein described which consists in bringing the matte into contact with such fused sulfid, converting the sulfids in part into sulfates, dissolving the sulfates associated with the sulfate of the alkaline metal, crystallizing the sulfates from such solution, and resmelting the same.

2. In the art of separating matte containing sulfids of metals unequally soluble in the fused sulfid of an alkaline metal, the method herein described which consists in bringing the matte into contact with such fused sulfid, converting the sulfids in part into sulfates, dissolving the sulfates associated with the sulfate of the alkaline metal, crystallizing the sulfates from such solution, and resmelting the same with matte and a reducing agent such as coke.

3. In the art of separating matte containing sulfids of nickel and copper, the method herein described which consists in bringing the matte into contact with the fused sulfid of an alkaline metal, converting the sulfids in part into sulfates, dissolving the sulfates associated with the sulfate of the alkaline metal, crystallizing the sulfates from such solution, and resmelting the same.

4. In the art of separating matte containing sulfids of nickel and copper, the method herein described which consists in bringing the matte into contact with the fused sulfid of an alkaline metal, converting the sulfids in part into sulfates, dissolving the sulfates associated with the sulfate of the alkaline metal, crystallizing the sulfates from such solution, and resmelting the same with matte and a reducing agent such as coke.

In testimony whereof I have hereunto set my hand December 22, 1905.

ROBERT R. MAFFETT.

Witnesses:
THOMAS W. BAKEWELL,
GEORGE H. SONNEBORN.